(12) United States Patent
Goudarzi et al.

(10) Patent No.: US 10,942,787 B2
(45) Date of Patent: Mar. 9, 2021

(54) INSTANCE MAPPING ENGINE AND TOOLS

(71) Applicant: ServiceNow, Inc., Santa Clara, CA (US)

(72) Inventors: Khashayar Goudarzi, Mukilteo, WA (US); Sharath Vaddempudi, Bellevue, WA (US)

(73) Assignee: ServiceNow, Inc., Santa Clara, CA (US)

( * ) Notice: Subject to any disclaimer, the term of this patent is extended or adjusted under 35 U.S.C. 154(b) by 193 days.

(21) Appl. No.: 16/189,875

(22) Filed: Nov. 13, 2018

(65) Prior Publication Data

US 2020/0151022 A1    May 14, 2020

(51) Int. Cl.
| | |
|---|---|
| *G06F 15/173* | (2006.01) |
| *G06F 9/50* | (2006.01) |
| *H04L 12/24* | (2006.01) |
| *G06F 9/445* | (2018.01) |
| *G06F 16/84* | (2019.01) |
| *H04L 29/08* | (2006.01) |
| *G06F 40/205* | (2020.01) |

(52) U.S. Cl.
CPC ........ *G06F 9/5077* (2013.01); *G06F 9/44505* (2013.01); *G06F 16/86* (2019.01); *H04L 41/0803* (2013.01); *H04L 41/0893* (2013.01); *H04L 41/22* (2013.01); *H04L 41/5029* (2013.01); *H04L 41/5054* (2013.01); *G06F 40/205* (2020.01); *H04L 67/10* (2013.01)

(58) Field of Classification Search
CPC .... G06F 9/5077; G06F 9/44505; G06F 16/86; G06F 40/205; H04L 41/0803; H04L 41/0893; H04L 41/22; H04L 41/5029; H04L 41/5054; H04L 67/10
See application file for complete search history.

(56) References Cited

U.S. PATENT DOCUMENTS

| | | | |
|---|---|---|---|
| 6,321,229 | B1 | 11/2001 | Goldman |
| 6,609,122 | B1 | 8/2003 | Ensor |
| 6,799,189 | B2 | 9/2004 | Huxoll |
| 6,816,898 | B1 | 11/2004 | Scarpelli |
| 6,895,586 | B1 | 5/2005 | Brasher |
| 7,020,706 | B2 | 3/2006 | Cates |
| 7,027,411 | B1 | 4/2006 | Pulsipher |

(Continued)

*Primary Examiner* — Jonathan A Bui
(74) *Attorney, Agent, or Firm* — Fletcher Yoder PC

(57) ABSTRACT

The presently disclosed systems and methods collect information associated with client instances, and use the information associated with the instances. In particular, information related to database servers and/or applications servers providing the instance may be retrieved from databases that store information relating to instances, and written and saved in an instance configuration file. Moreover, instances may be deployed or provisioned by reading an instance configuration file and setting properties of the instance using the parameters saved in the instance configuration file. Two instance configuration files may be compared to determine differences between the two files. Additionally, the instance may be reverted back to the previously healthy version of the instance using the previous instance configuration file. The disclosed systems and methods also include enforcing policies related to instances, and determining financial costs associated with implementing an instance defined by an instance configuration file.

20 Claims, 15 Drawing Sheets

```
 1  properties:
 2    name: datacentertest
 3    instance_id: 1234xyz
 4    assigned_to: service-now.com|ServiceNow
 5    resources:
 6    -type: node
 7      count_min: 4
 8      count_max: 5
 9      properties:
10        lease_id: mylease_Idlmy
11        operational_status: Operational
12        u_peak_hourly_cpu: 5-10
13        u_discovered_node_port: 16000-17000
14    -type: database
15      count_min: 2
16      count_max: 2
17      properties:
18        instance_name: datacentertest
           is_clustered: true|false
```

(56) References Cited

U.S. PATENT DOCUMENTS

| | | | |
|---|---|---|---|
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pouheidari | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,843,503 B2 * | 9/2014 | Ayachitula | G06F 8/71 707/755 |
| 9,015,188 B2 | 4/2015 | Behen | |
| 9,037,536 B2 | 5/2015 | Vos | |
| 9,065,783 B2 | 6/2015 | Ding | |
| 9,098,322 B2 | 8/2015 | Apte | |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,535,737 B2 | 1/2017 | Joy | |
| 9,613,030 B2 | 4/2017 | Kumar | |
| 9,645,833 B2 | 5/2017 | Mueller | |
| 9,654,833 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,819,729 B2 | 11/2017 | Moon | |
| 9,852,165 B2 | 12/2017 | Morozov | |
| 10,002,203 B2 | 6/2018 | George | |
| 2010/0125477 A1 * | 5/2010 | Mousseau | G06F 9/5077 717/177 |
| 2012/0297059 A1 * | 11/2012 | Bross | G06F 11/3051 709/224 |
| 2015/0188999 A1 * | 7/2015 | Manuel-Devadoss | H04L 67/2814 709/203 |
| 2016/0094647 A1 * | 3/2016 | Mordani | H04L 67/1044 709/226 |
| 2016/0142485 A1 * | 5/2016 | Mitkar | G06F 16/128 707/681 |
| 2016/0157280 A1 * | 6/2016 | Avila Gonzalez | H04W 76/15 370/328 |
| 2017/0012819 A1 * | 1/2017 | Raheja | G06F 9/5077 |
| 2017/0193021 A1 * | 7/2017 | Deng | G06Q 10/06 |
| 2018/0211542 A1 * | 7/2018 | Narayan | G08G 1/205 |
| 2018/0270120 A1 * | 9/2018 | Tung | H04W 4/50 |
| 2019/0251962 A1 * | 8/2019 | Sanjay | G10L 15/16 |
| 2020/0092253 A1 * | 3/2020 | Gray | H04L 67/02 |

* cited by examiner

FIG. 4

```
1   description: Something about the instance
2   properties:
3     u_has_vanity_url: false
4     sys_updated_by: system
5     can_print: false
6     u_ha_tested: 9edc2e166f74b9006626a9cc5d3ee48d
7   resources:
8   - type: node
9     properties:
10      operational_status: 1
11      u_capacity_state: reserved
12      branch: glide-trackdatacenternext-12-02-2015_04-27-2018_1137
13      u_consumption_capacity_type: active
14  - type: node
15    properties:
16      operational_status: 1
17      u_capacity_state: reserved
18      branch: glide-trackdatacenternext-12-02-2015_04-27-2018_1137
19      u_consumption_capacity_type: active
20  - type: database
21    properties:
22      skip_sync: false
23      u_discovery_exceptions: false
24      sys_updated_by: datacenter_sjc103_disco_midserver2
25      sys_created_on: 2018-04-07 18:51:26
26      u_size: 2147483647
27      sys_created_by: datacenter_sjc103_disco_midserver2
28      u_integrity_check: passed
```

```
110

1    dm_version: user.double
        2    dm_description: user.string
        3    dm_properties:
        4        name: instance.name
        5        instance_id: instance.instance_id
        6        used_for: instance.used_for
        7        primary_datacenter: instance.manufacturer
 24     8        resources:
        9        - type: node  —116
       10   112⤴    properties:
       11            name: node.branch
       12            ip_address: node.u_capacity_state
 44    13            host: node.discovery_source
       14        - type: database
       15            properties:
       16            hostname: database.sys_created_by
       17            owned_by: database.u.taskibd_size
       18            name: database.last_discovered
       19            sys_id: database.sys_class_name
```

FIG. 7

|    |                                                      |     |    |                                                      |
|----|------------------------------------------------------|-----|----|------------------------------------------------------|
| 24 | u_port:                                              |     | 24 | u_port:                                              |
| 25 | department:                                          |     | 25 | department:                                          |
| 26 | u_ha2_ready: true                                    |     | 26 | u_ha2_ready: true                                    |
| 27 | can_host: false                                      |     | 27 | can_host: false                                      |
| 28 | ip_address:                                          | 176 | 28 | ip_address:                                          |
| 29 − | u_mem_max_among_nodes: 2.86                        |     | 29 + | u_mem_max_among_nodes: 2.88                        |
| 30 | u_connect_inbound_ritm:                              |     | 30 | u_connect_inbound_ritm:                              |
| 31 | name: datacentertest                                 |     | 31 | name: datacentertest                                 |
| 32 | u_vpn_ready: true                                    |     | 32 | u_vpn_ready: true                                    |
| 33 | install_date:                                        |     | 33 | install_date:                                        |
| 34 | used_for: Test                                       |     | 34 | used_for: Test                                       |

COLLAPSED 36 LINES

|    |                                                                  |     |    |                                                                  |
|----|------------------------------------------------------------------|-----|----|------------------------------------------------------------------|
| 71 | sys_class_name: cmdb_ci_service_now                              |     | 71 | sys_class_name: cmdb_ci_service_now                              |
| 72 | u_is_highly_available: true                                      |     | 72 | u_is_highly_available: true                                      |
| 73 | parent:                                                          |     | 73 | parent:                                                          |
| 74 | u_is_suspended: false                                            |     | 74 | u_is_suspended: false                                            |
| 75 | warranty_expiration:                                             | 176 | 75 | warranty_expiration:                                             |
| 76 − | u_cpu_max_among_nodes: 50436.46                               |     | 76 + | u_cpu_max_among_nodes: 56855.7                                |
| 77 | sys_domain: global                                               |     | 77 | sys_domain: global                                               |
| 78 | u_read_replicas: false                                           |     | 78 | u_read_replicas: false                                           |
| 79 | u_is_iqoq: false                                                 |     | 79 | u_is_iqoq: false                                                 |
| 80 | manufacturer: bcd73a0ad0bbf53801f322a4eb09a8f2                   |     | 80 | manufacturer: bcd73a0ad0bbf53801f322a4eb09a8f2                   |
| 81 | u_uses_servicenow_pop: false                                     |     | 81 | u_uses_servicenow_pop: false                                     |
| 82 | cost_cc: USD                                                     |     | 82 | cost_cc: USD                                                     |
| 83 | u_consumption_capacity_why: CPU                                  | 176 | 83 | u_consumption_capacity_why: CPU                                  |
| 84 − | u_cpu_average_among_nodes: 41293.55                           |     | 84 + | u_cpu_average_among_nodes: 43680.13                           |
| 85 | u_connect_ready: true                                            |     | 85 | u_connect_ready: true                                            |
| 86 | sys_created_on: 2011-06-17 08:51:09                              |     | 86 | sys_created_on: 2011-06-17 08:51:09                              |
| 87 | fqdn:                                                            |     | 87 | fqdn:                                                            |
| 88 | u_primary_datacenter: f3766e3a4f4b420094ac220f0310c716           |     | 88 | u_primary_datacenter: f3766e3a4f4b420094ac220f0310c716           |
| 89 | u_service_url: https://datacentertest.service-now.com/           |     | 89 | u_service_url: https://datacentertest.service-now.com/           |
| 90 | support_group:                                                   |     | 90 | support_group:                                                   |
| 91 | u_type: Hosted                                                   |     | 91 | u_type: Hosted                                                   |
| 92 | assignment_group:                                                |     | 92 | assignment_group:                                                |
| 93 | attributes:                                                      | 176 | 93 | attributes:                                                      |
| 94 − | u_consumption_capacity_date: 2018-08-08 03:01:07              |     | 94 + | u_consumption_capacity_date: 2018-08-16 03:13:35              |
| 95 | u_upgrade_alarm: false                                           |     | 95 | u_upgrade_alarm: false                                           |
| 96 | u_for_internal_testing: false                                    |     | 96 | u_for_internal_testing: false                                    |
| 97 | subcategory:                                                     |     | 97 | subcategory:                                                     |
| 98 | returned_from_repair                                             |     | 98 | returned_from_repair                                             |

FIG. 8

```
1  properties:
2  name: datacentertest
3  instance_id: 1234xyz
4  assigned_to: service-now.com|ServiceNow
5  resources:
6   -type: node
7    count_min: 4
8    count_max: 5
9    properties:
10     lease_id: mylease_Idlmy
11     operational_status: Operational
12     u_peak_hourly_cpu: 5-10
13     u_discovered_node_port: 16000-17000
14  -type: database
15    count_min: 2
16    count_max: 2
17    properties:
18     instance_name: datacentertest
        is_clustered: true|false
```

FIG. 9

INSTANCE MAPPING ENGINE AND TOOLS

TECHNICAL FIELD

The present disclosure relates generally to network environment and service provider cloud infrastructure client instances (also referred to herein as client instances or instances), and, more particularly, collecting information associated with the instances and using the information associated with the instances.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Such cloud computing resources may include configuration management databases (CMDBs), which store information relating to instances, configuration items (e.g., manufacturer, vendor, location, and so forth), alerts, service metrics, and maintenance status information. An instance may provide services to users and be implemented via database servers and/or applications servers. For example, an information technology service provider may allocate one or more database servers and/or applications servers to provision or deploy the instance, which may provide information technology services and products to a client.

At times, an instance provider or a client served by the instance may desire to review information associated with the instance. For example, if the instance generates an error or is otherwise faulty, the instance provider may desire to review configurations settings or properties of the instance to determine the cause of the error or the faulty behavior. As another example, the client may desire to review financial costs associated with resources allocated to or used by the instance in order to determine where cost savings may be achieved.

Typically, to collect such information associated with an instance, the instance provider or the client may submit search queries to the CMDBs until the information is retrieved. Moreover, to collect, for example, all information associated with the database servers and/or applications servers providing the instance, the instance provider or the client may generate and then submit multiple such search queries. As such, to collect the information desired to be reviewed by the instance provider or the client may be an inefficient and tedious process.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes systems and methods that collect information associated with network environment and service provider cloud infrastructure client instances (also referred to herein as client instances or instances), and use the information associated with the instances. In particular, information related to the database servers and/or applications servers providing the instance may be retrieved from configuration management databases (CMDBs) that store information relating to instances, and written and saved in an instance configuration file. Thus, the instance configuration file provides a single, centralized source of information related to an instance. As such, a user (e.g., a client or service provider engineer) desiring to retrieve or view information relating to an instance may avoid the tedious process of submitting multiple search queries to CMDBs storing such information, and instead generate and/or view the corresponding instance configuration file of the instance.

Moreover, instances may be deployed or provisioned by reading an instance configuration file and setting properties of the instance using the parameters saved in the instance configuration file. Two instance configuration files may be compared to determine differences between the two files. For example, if an instance generates an error or is otherwise faulty or unhealthy, a previous instance configuration file corresponding to a previously healthy version of the instance may be compared to the current instance configuration file, and the differences determined. The differences may be examined or analyzed to determine the source of the error. Additionally, the instance may be reverted back to the previously healthy version of the instance using the previous instance configuration file.

The disclosed systems and methods also include enforcing policies related to instances. For example, policies may restrict usage of certain resources used by an instance. If there is an attempt to provision or deploy an instance using an instance configuration file that violates a policy (e.g., exceeds a limited use of a resource), then the attempt may be blocked or prevented from executing. The disclosed systems and methods may also include determining financial costs associated with implementing an instance defined by an instance configuration file. In this manner, clients may design and price difference instance configurations without having to execute the configurations.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 4 is an excerpt of an example instance configuration file generated by the instance mapping engine of FIG. 3, according to embodiments of the present disclosure;

FIG. 7 is a portion of an example mapping rules file, according to embodiments of the present disclosure;

FIG. 8 is a portion of an example instance configuration comparison file, according to embodiments of the present disclosure;

FIG. 9 is a portion of an example policy file, according to embodiments of the present disclosure;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device that includes, but is not limited to a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

The present disclosure relates to collecting information associated with network environment and service provider cloud infrastructure client instances (also referred to herein as client instances or instances), and using the information associated with the instances.

Figure 1:
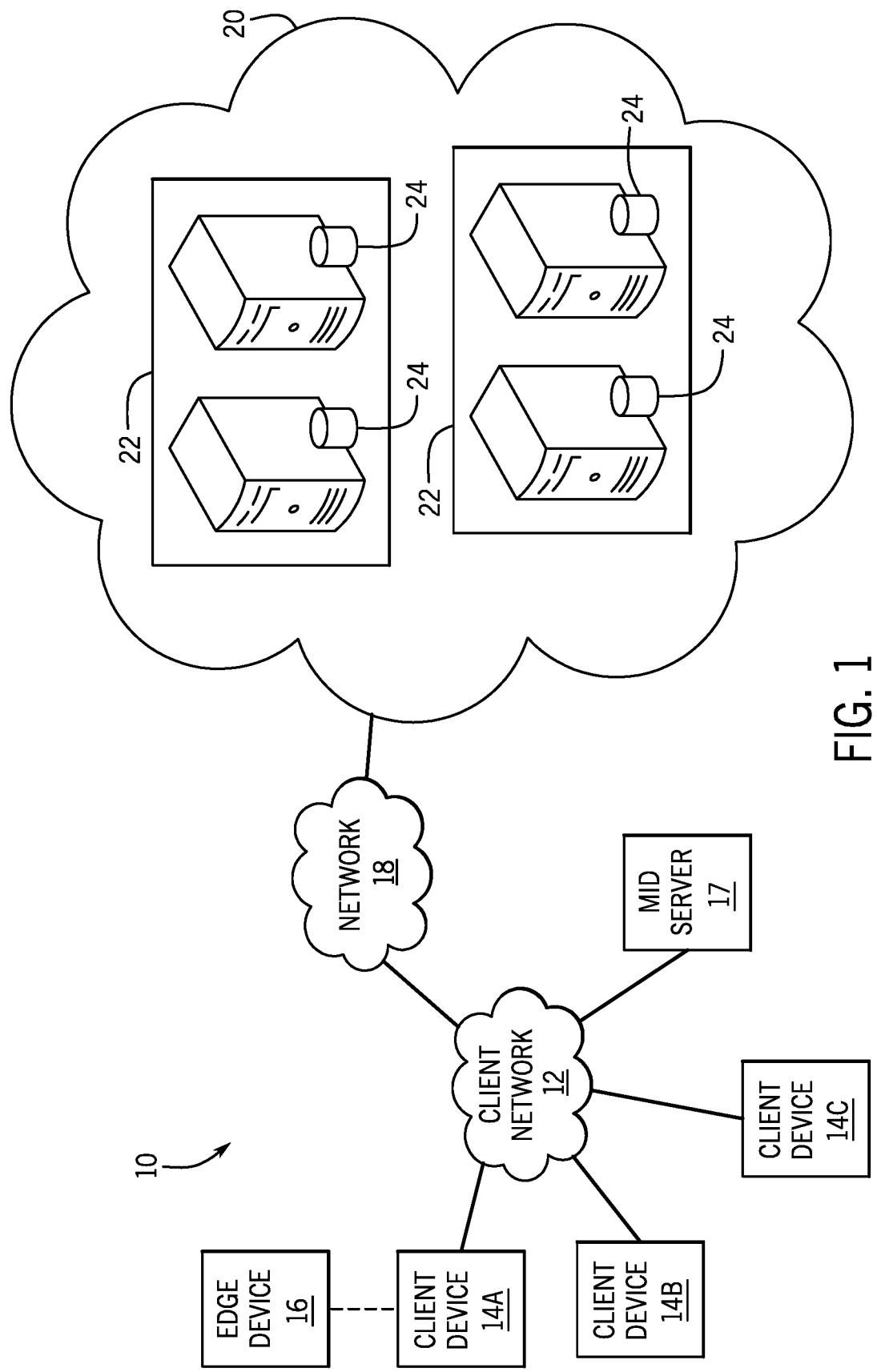
FIG. 1 is a block diagram of an embodiment of a cloud computing system in which embodiments of the present disclosure may operate.

With this in mind, the following figures relate to various types of generalized system architectures or configurations that may be employed to provide services to an organization in a multi-instance framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, in order to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center 22 could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers 22 with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 24 and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
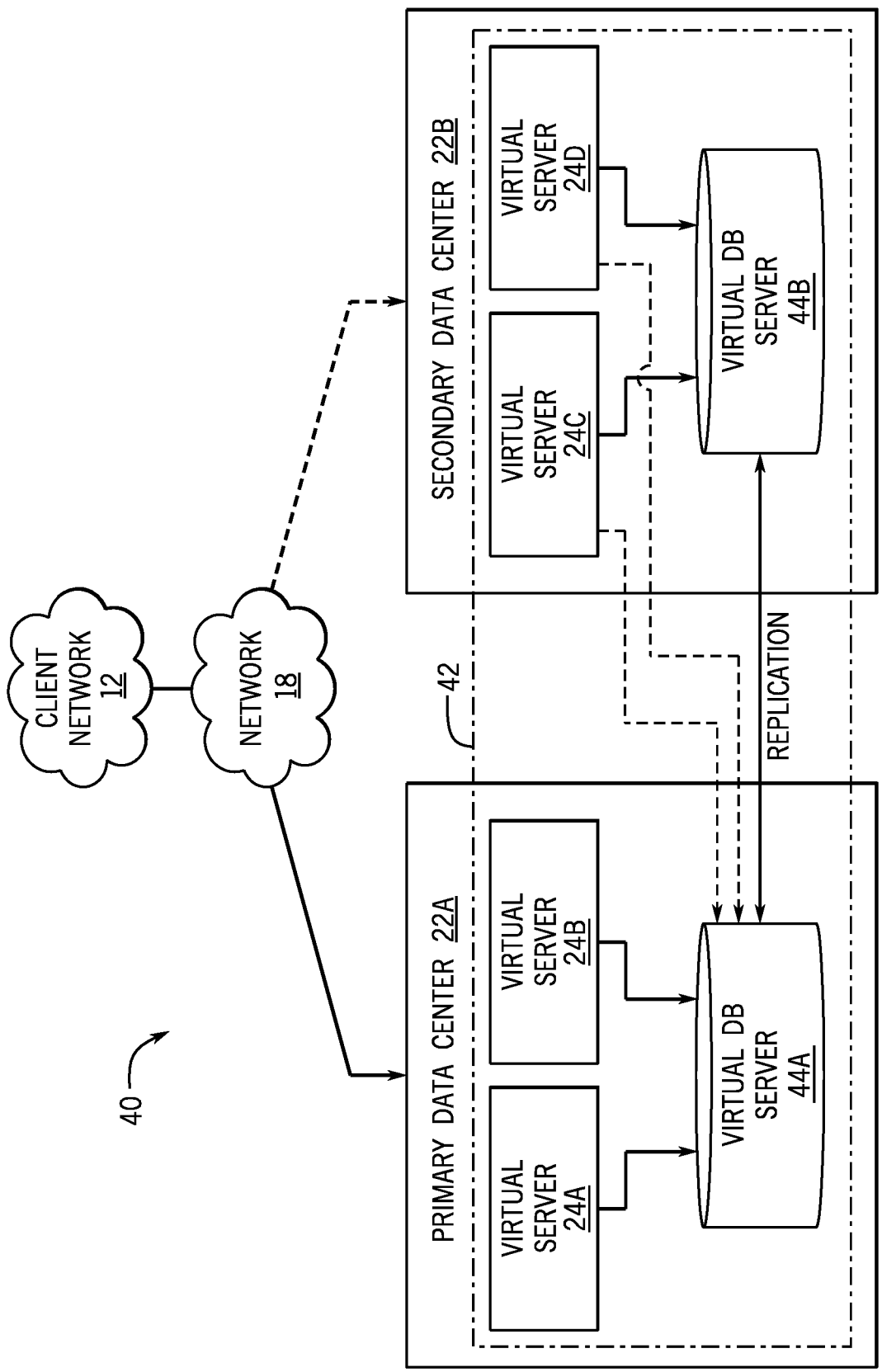
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance or instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. In the depicted example, to facilitate availability of the client instance 42, the virtual servers 24A-24D and virtual database servers 44A and 44B are allocated to two different data centers 22A and 22B so that one of the data centers 22 acts as a backup data center. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

Figure 3:
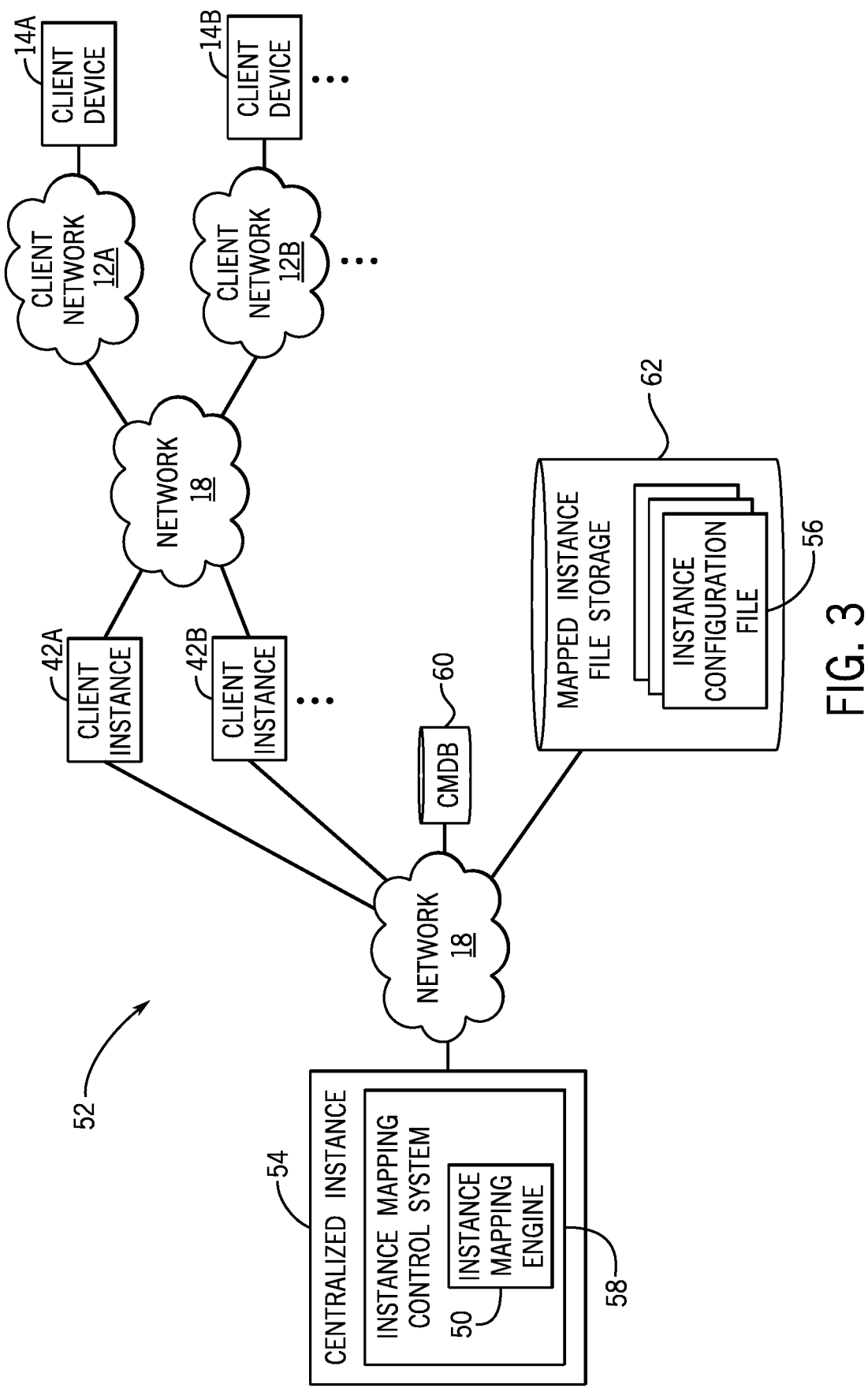
FIG. 3 is a schematic diagram of an embodiment of an instance mapping engine in a centralized, multi-instance cloud architecture where embodiments of the present disclosure may operate.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A, 24B, 24C, 24D and virtual database servers 44A, 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein. FIG. 3 is a schematic diagram of an embodiment of an instance mapping engine 50 in a centralized, multi-instance cloud architecture 52 where embodiments of the present disclosure may operate. FIG. 3 illustrates that the centralized, multi-instance cloud architecture 52 includes a centralized instance 54 that is connected to one or more client instances 42A, 42B by the network 18. Like the client instances 42, the centralized instance 54 may be associated with (e.g., supported and enabled by) dedicated virtual servers (e.g., virtual servers 24) and dedicated database servers (e.g., virtual database servers 44). The centralized instance 54 may manage the client instances 42 and send and receive information to and from the client instances 42.

In particular, the centralized instance 54 may include the instance mapping engine 50, which maps instances 42, generates instances 42, and/or adjusts instances 42. For example, the instance mapping engine 50 may receive a request to generate an instance configuration file 56 with an instance name or other identifier as a parameter. In some embodiments, a client or service provider engineer may send the request and the instance name or identifier to the instance mapping engine 50 (e.g., via a user interface and/or web browser). The instance mapping engine 50 may be implemented in hardware (e.g., circuitry), software (e.g., instructions for execution by a processor), or a combination of the two.

The instance mapping engine 50 may be part of an instance mapping control system 58 that facilitates operation of the instance mapping engine 50. For example, the instance mapping control system 58 may query a configuration management database (CMDB) 60 for properties of the instance 42. The CMDB 60 may store properties of an instance 42, including properties of each database server 44 and/or application server 24 (also referred to as a node) of the instance 42. The properties may include, for example, names, identifiers, uses, statuses, addresses, host names, host identifiers, capacities, sizes, and the like, of the database servers 44 and/or application servers 24. In the present disclosure, each database server 44 and/or application server 24 of an instance 42 may be referred to as a resource of the instance 42. For example, the CMDB 60 may store a maximum number of database servers 44 allocated and maximum number of application servers 24 allocated to the instance 42. In some cases, the instance mapping control system 58 may send two queries (or two sets of queries): a first to query the CMDB 60 for information related to the database servers 44 of the instance 42, and a second to query the CMDB 60 for information related to the application servers 24 of the instance 42. Moreover, in some embodiments, the instance mapping control system 58 may query the CMDB 60 using an application programming interface that enables the instance mapping control system 58 to communicate with the CMDB 60. Although one CMDB 60 is illustrated in FIG. 3, it should be understood that the illustrated CMDB 60 is representative and may in fact represent multiple CMDBs 60 that store information associated with multiple instances 42.

The instance mapping engine 50 may then map or organize (e.g., in a hierarchical format) the resulting information in the instance configuration file 56, which may be stored in an instance configuration file storage 62. The instance configuration file 56 may be configuration file that stores and details information associated with an instance 42. For example, FIG. 4 is an excerpt of an example instance configuration file 56 generated by the instance mapping engine 50, according to embodiments of the present disclosure. As illustrated, the instance configuration file 56 lists nodes or application servers 24, and properties or attributes (e.g., operational-status, u_capacity state, branch, u_consumption_capacity_type, and so forth) of the nodes or application servers 24. In the depicted example, the instance configuration file 56 also lists a database server 44 and properties or attributes (e.g., skip_sync, u_discovery_exceptions, sys_updated_by, sys_created_on, u_size, sys_created by, u_integrity_check, and so forth) of the database server 44. The instance configuration file storage 62 may include any tangible, non-transitory, and computer-readable storage media, such as a storage device, a memory device, a database, or any other suitable storage medium.

Although FIGS. 1-3 illustrate specific embodiments of a cloud computing system 10 and a multi-instance cloud architecture 40, respectively, the disclosure is not limited to the specific embodiments illustrated in FIGS. 1-3. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual server into a single virtual server. Using FIG. 2 as an example, the virtual servers 24A-D and virtual database servers 44A and 44B may be combined into a single virtual server. Additionally, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1-3 are only examples to facilitate ease of description and explanation and are not intended to limit the disclosure to the specific examples illustrated therein.

As may be appreciated, the respective architectures and frameworks discussed with respect to FIGS. 1-3 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 5:
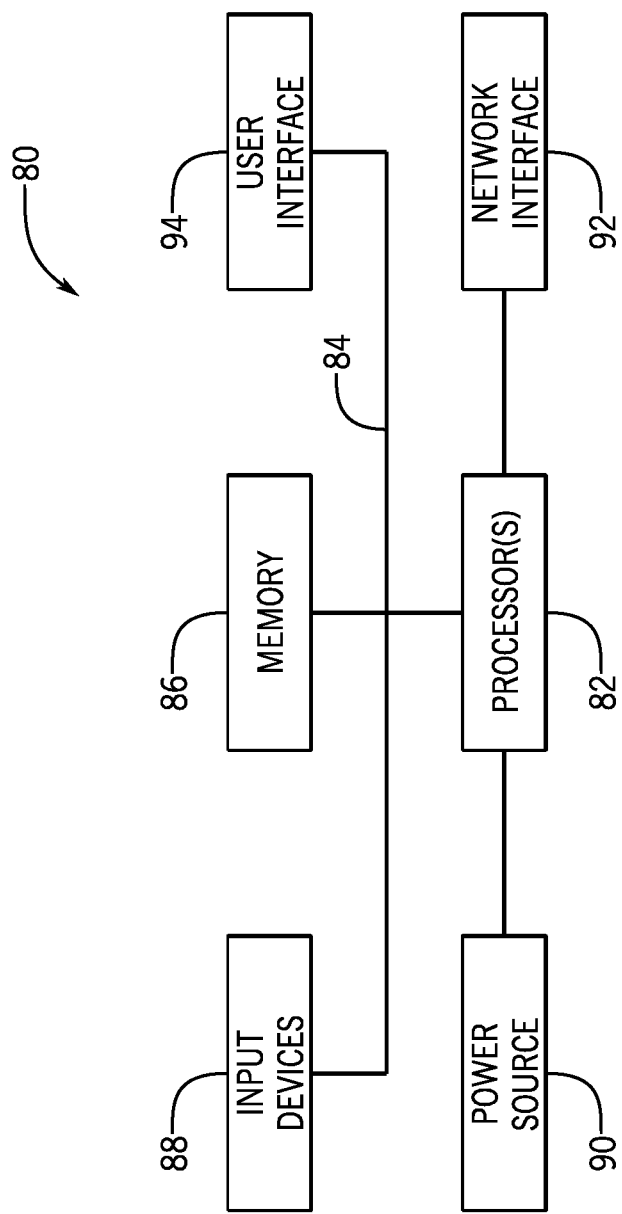
FIG. 5 is a block diagram of a computing device utilized in a computing system that may be present in FIGS. 1-3, in accordance with aspects of the present disclosure.

With this in mind, and by way of background, it may be appreciated that the present approach may be implemented using one or more processor-based systems such as shown in FIG. 5. That is, the instance mapping engine 50 and/or the instance mapping control system 58 may be implemented using the processor-based system shown in FIG. 5. Likewise, applications and/or databases utilized in the present approach may be stored, employed, and/or maintained on such processor-based systems. As may be appreciated, such systems as shown in FIG. 5 may be present in a distributed computing environment, a networked environment, or other multi-computer platform or architecture. Likewise, systems such as that shown in FIG. 5, may be used in supporting or communicating with one or more virtual environments or computational instances on which the present approach may be implemented.

As such, an example computer system may include some or all of the computer components depicted in FIG. 5. FIG. 5 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86. In some embodiments, the processor 82 may control, operate, and/or be part of the instance mapping engine 50 and/or the instance mapping control system 58.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 5, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing system 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 6:
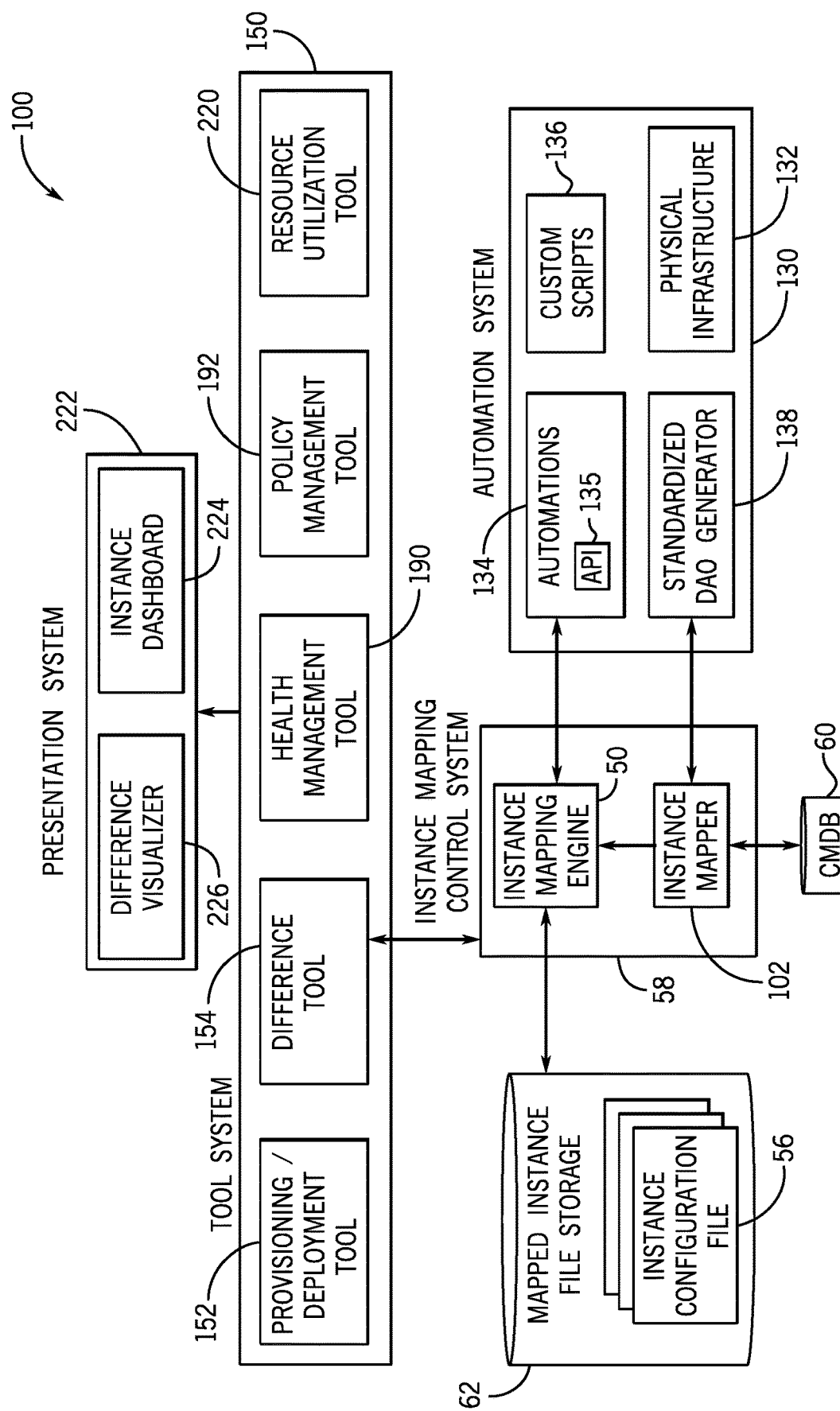
FIG. 6 is an instance mapping system of the centralized, multi-instance cloud architecture of FIG. 3, according to embodiments of the present disclosure.

FIG. 6 is an instance mapping system 100 of the centralized, multi-instance cloud architecture 52 of FIG. 3, according to embodiments of the present disclosure. The instance mapping system 100 may obtain and/or receive information associated with instances 42, map and/or store the instances 42, use instance configuration files 56 (e.g., deploy, compare, revert, manage, and/or analyze costs of the instance configuration files 56), and present the instances and/or results of using the instances 42 (e.g., to a user). As illustrated, the instance mapping system 100 includes the instance mapping control system 58 and the instance mapping engine 50 described above. The instance mapping control system 58 also may include an instance mapper 102 that obtains or receives information associated with an instance 42 from the CMDB 60 and maps the instance 42 to an instance configuration file 56.

In particular, the instance mapper 102 may use a mapping rules file that provides rules or a template or skeleton which may be followed to generate an instance configuration file 56. For example, FIG. 7 is a portion of an example mapping rules file 110, according to embodiments of the present disclosure. In particular, the mapping rules file 110 may include fields 112 having field names 114, such as "type" (which corresponds to resource type) and field paths 116, such as "node," that provide a path to determine a field value of the field 112. The fields 112 may each correspond to resource types (e.g., application servers 24 or database servers 44) of the instance 42 or properties of the application servers 24 or database servers 44 of the instance 42. The instance mapper 102 may provide or fill in the field value by providing the path 116 to the CMDB 60 and returning the resulting value. For example, the example instance configuration file 56 of FIG. 4 illustrates fields having field names with field values provided by the instance mapper 102. For purposes of illustration, field paths 116 in the mapping rules file 110 and field values in the instance configuration filed 56 of FIG. 4 have been underlined. The instance mapping control system 58 may then store the instance configuration file 56 in the instance configuration file storage 62.

The instance mapping system 100 may include an automation system 130 that enables requests for mapping instances 42 and/or using instance configuration files 56. As illustrated, the automation system 130 includes a physical infrastructure 132 that may provide such requests to be input to the instance mapping system 100. For example, the physical infrastructure 132 may include the computing system 80 of FIG. 5 or any other suitable device or system for which a user (e.g., a client or service provider engineer) may enter a request. The automation system 130 may also include automations 134 (e.g., in the form of instructions executable by a processor) that automatically send requests to map instances 42 and/or use instance configuration files 56 without user prompting. In some cases, users may generate the automations 134 via the physical infrastructure 132. For example, automations 134 may include requesting that the instance mapping engine 50 periodically (e.g., once a day, once a week, once every ten days, once a month, or any other suitable frequency) map a particular instance 42 (via the instance mapper 102). The automations 134 may include an application programming interface (API) 136 that enables the automation system 130 to communicate with the instance mapping control system 58.

As illustrated, the automations 134 may include custom scripts or instructions 136 that enable a user to provide customizations or set configurations associated with requesting mapping instances 42 and/or using instance configuration files 56. The automations 134 may also include a standardized data access object (DAO) generator 138 that provides an abstract interface to communicate with or use the instance mapper 102. That is, the standardized DAO generator 138 may convert requests for mapping instances 42 from the automations 134, the physical infrastructure 132, and/or the custom scripts 136 to a form that the instance mapper 102 may understand and/or process.

The instance mapping system 100 may include a tool system 150 that enables using the instance configuration files 56. As illustrated, the tool system 150 includes a provisioning/deployment tool 152 that provisions and/or deploys an instance 42 based on an instance configuration file 56. In particular, the provisioning/deployment tool 152 may deploy an instance 42 using a number of application servers 24 specified by an instance configuration file 56, a number of database servers 44 specified by the instance configuration file 56, and/or provision or allocate resources to the application servers 24 and/or the database servers 44 specified by the instance configuration file 56. As such, a service provider engineer may avoid having to manually configure settings or properties of an instance 42 to provision and/or deploy a desired instance 42. Instead, the service provider engineer may create or generate an instance configuration file 56 with the properties of the desired instance 42, and the provisioning/deployment tool 152 may simply provision and/or deploy the desired instance 42 based on the instance configuration file 56, greatly simplifying and expediting the process of provisioning or deploying an instance 42.

The tool system 150 may also include a difference tool 154 that compares and determines differences between two instance configuration files 56. In particular, the difference tool 154 may parse each instance configuration file 56, compare, line-by-line, the two instance configuration files 56, and mark the lines that are different between the two instance configuration files 56. For example, FIG. 8 is a portion of an example instance configuration comparison file 170, according to embodiments of the present disclosure. The left side of the instance configuration comparison file 170 corresponds to a first instance configuration file 172 and the right side of the instance configuration comparison file 170 corresponds to a second instance configuration file 174. The difference tool 154 may visually indicate or mark corresponding lines in both instance configuration files 172, 174 that are different. For example, in FIG. 8, the difference tool 154 has marked lines 29, 76, 84, and 94 as different by shading 176 the different lines.

The difference tool 154 may be particularly useful when an instance 42 generates an error or is otherwise determined to be unhealthy. For example, a user may use the difference tool 154 to compare a previous instance configuration file corresponding to a previously healthy version of the instance 42 to the current instance configuration file 56. The differences determined by the difference tool 154 may be examined or analyzed to determine the source of the error.

The tool system 150 may also include a health management tool 190 that identifies or marks instance configuration files 56 as healthy or unhealthy, and replaces an instance 42 using an instance configuration file 56. In some cases, the health management tool 190 may revert an instance 42 to a previously healthy version of the instance 42 using a previous instance configuration file 56 corresponding to the previously healthy version of the instance 42. The health management tool 190 may identify an instance configuration file 56 as healthy based on any suitable metric. For example, the health management tool 190 may identify an instance configuration file 56 as healthy if the corresponding instance 42 does not generate any errors, or generates errors below a threshold number of errors. Similarly, an instance configuration file 56 may be unhealthy if the corresponding instance 42 does not generates errors, or generates errors above a threshold number of errors. In this manner, the health management tool 190 may quickly and conveniently restore an instance 42 to a healthy state.

The tool system 150 may further include a policy management tool 192 that enforces policies related to instances 42. For example, policies may restrict usage of certain resources used by an instance 42. If there is an attempt to provision or deploy an instance 42 using an instance configuration file 56 that violates a policy (e.g., exceeds a limited use of a resource), then the attempt may be blocked or prevented from executing. As an example, if a policy includes limiting the number of application servers 24 allocated to an instance 42 to three application servers 24, and a user attempts to provision or deploy the instance 42 with an instance configuration file 56 that provides four application servers 24, the policy management tool 192 may block or prevent provisioning or deployment of the instance 42.

For example, FIG. 9 is a portion of an example policy file 200, according to embodiments of the present disclosure. The policy file 200 may include policies on certain lines of the policy file 200 that may be enforced on an instance 42. As illustrated, the policy file 200 includes a first policy 202 for instances 42 to have a minimum of four nodes or application servers 24. The policy file 200 also includes a second policy 204 for instances 42 to have a maximum of five nodes or application servers 24. Thus, if a user attempts to provision or deploy an instance 42 with an instance configuration file 56 that provides less than four application servers 24 or more than five application servers 24, the policy management tool 192 may block or prevent provisioning or deployment of the instance 42. However, if the user attempts to provision or deploy an instance 42 with an instance configuration file 56 that provides four or five application servers 24, the policy management tool 192 may allow provisioning or deployment of the instance 42. As such, the policy management tool 192 may provide an efficient and effective mechanism to enforce policies related to instances 42.

The tool system 150 may also include a resource utilization tool 220 that determines financial costs associated with implementing an instance 42 defined by an instance configuration file 56. In particular, the resource utilization tool 220 may parse the instance configuration file 56 and determine a financial cost for each application server 24 and/or database server 44 in the instance configuration file 56, as well as each property of the respective application server 24 and/or database server 44. In some embodiments, the resource utilization tool 220 may query a database (e.g., stored in a memory or storage device) that returns a cost for an application server 24, a database server 44, or a property of the application server 24 or database server 44. The resource utilization tool 220 may then provision or deploy an instance cost file as an itemized bill with the costs for each application server 24, database server 44, and/or property, a total bill for all costs summed together, or both. In this manner, clients may design and price difference instance configurations without having to execute the configurations.

The instance mapping system 100 may include a presentation system 222 that presents, displays, or otherwise outputs information associated with instances 42, instance configuration files 56, and/or using the instance configuration files 56 for analysis or viewing. As illustrated, the presentation system 222 includes an instance dashboard 224 that enables viewing or presentation of information related to instances 42. For example, the instance dashboard 224 may display information related to each application server 24, database server 44, and/or property of an instance 42. That is, the instance dashboard 224 may display each application server 24 and database server 44 of an instance 42, as well as, for example, names, identifiers, uses, statuses, addresses, host names, host identifiers, capacities, sizes, and the like, of the respective application server 24 or database server 44. In some embodiments, the instance dashboard 224 may display some or all of the information illustrated in the instance configuration file 56 of FIG. 4.

The instance mapping system 100 may also include a difference visualizer 226 that presents, displays, or otherwise outputs information associated with differences between two different instance configuration files 56. In some embodiments, the difference visualizer 226 may display the instance configuration comparison file 170 of FIG. 8, and identify the corresponding lines in the instance configuration files 56 that are different.

Figure 10:
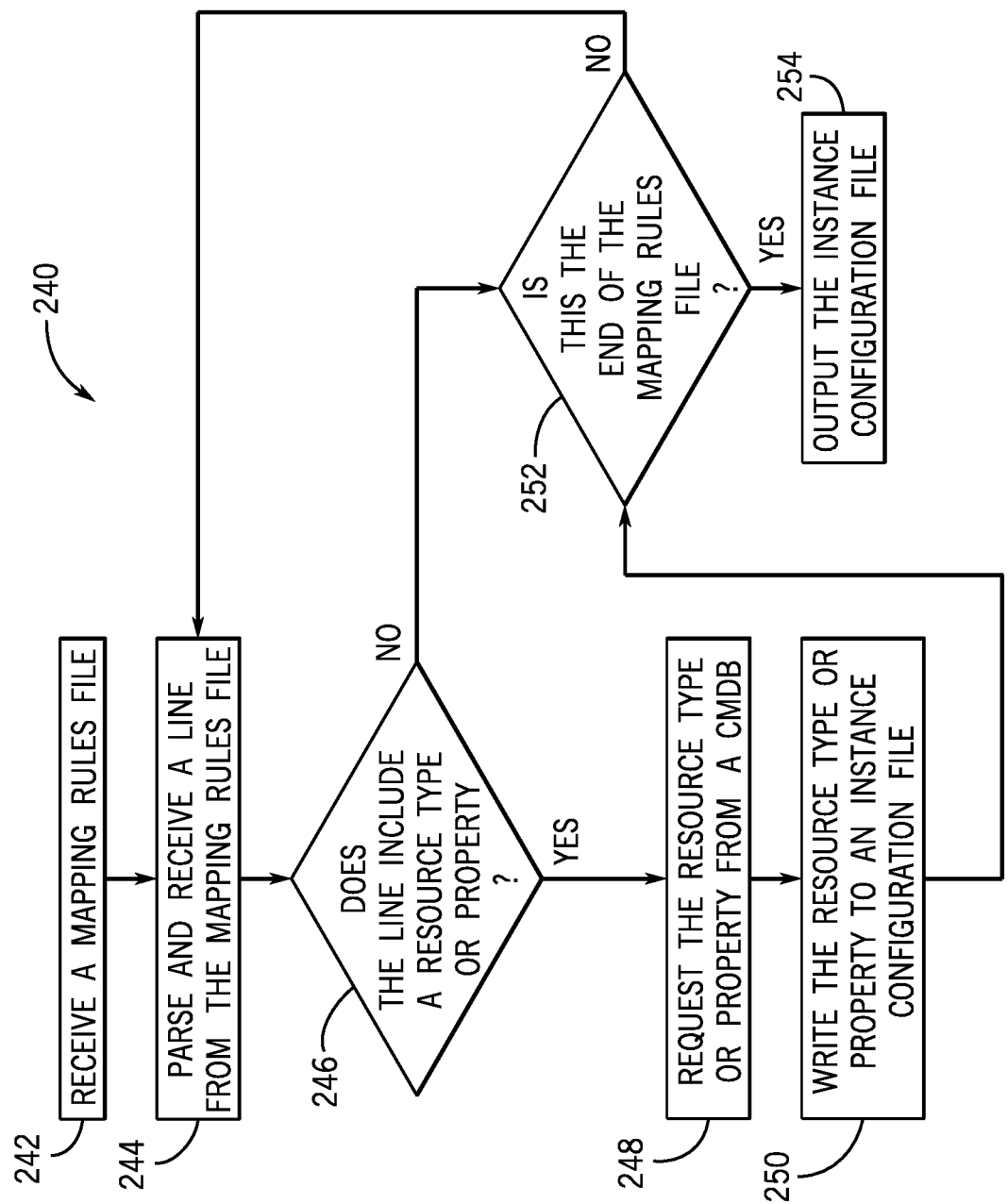
FIG. 10 is a flowchart of a process for mapping an instance, according to embodiments of the present disclosure.

FIG. 10 is a flowchart of a process 240 for mapping an instance 42, according to embodiments of the present disclosure. The process 240 may be implemented in the form of a software application that includes instructions executable by at least one suitable processor of the cloud computing system 10, such as a processor 82. In particular, the process 240 may be performed by the instance mapper 102 as operated by the instance mapping engine 50. As such, at least some of the following steps may be described as being performed by the processor 82, as part of the instance mapping engine 50, controlling the instance mapper 102. The illustrated process 240 is merely provided as an example, and in other embodiments, certain illustrated steps of the process 240 may be performed in other orders, skipped, or repeated, in accordance with the present disclosure.

As illustrated, in process block 242, the processor 82 receives a mapping rules file 110, such as that shown in FIG. 7. The mapping rules file 110 may provide rules or a template or skeleton for which to follow in generating an instance configuration file 56. In some embodiments, a memory or storage device, such as the memory 86, may store the mapping rules file 110, and the processor 82 may receive the mapping rules file 110 from the memory 86 in response to receiving a request to generate an instance configuration file 56 (from a user via the physical infrastructure 132 or the automations 134).

In process block 244, the processor 82 parses and receives a line from the mapping rules file 110. A line from the mapping rules file 110 may include fields 112 that each correspond to resource types (e.g., application servers 24 or database servers 44) of the instance 42 or properties of the application servers 24 or database servers 44 of the instance 42. Each field 112 may include a field name 114 and a field path 116. The field path 116 may provide a path in the CMDB 60 to determine a field value of the field 112.

In decision block 246, the processor 82 determines whether the line includes a resource type or property of the instance 42. If the processor 82 determines that the line includes a resource type or property of the instance 42, then the processor 82, in process block 248, requests the resource type or property from the CMDB 60. In particular, the processor 82 may send the field path 116 of the line to the CMDB 60, which may return the resource type or property.

In process block 250, the processor 82 writes the resource type or property to an instance configuration file 56. For example, FIG. 4 illustrates an example instance configuration file 56 having fields 112 corresponding to resource types and properties written by the processor 82.

Then, or if the processor 82 determines that the line does not include a resource type or property of the instance 42 from decision block 246, the processor 82, in decision block 252, determines whether the end of the mapping rules file 110 has been reached (e.g., such that the entire mapping rules file 110 has been parsed). If not, the processor 82 proceeds to the next line of the mapping rules file 110 at process block 244. If so, in process block 254, the processor 82 outputs the instance configuration file 56. In some cases, the processor 82 may save the instance configuration file 56 in the instance configuration file storage 62. In one embodiment, a user may view the instance configuration file 56 in the instance dashboard 224 of the presentation system 222. In this manner, the process 240 may enable the processor 82 to map an instance 42 to an instance configuration file 56. Thus, the instance configuration file 56 provides a single, centralized source of information related to an instance 42. As such, a user (e.g., a client or service provider engineer) desiring to retrieve or view information relating to an instance 42 may avoid the tedious process of submitting multiple search queries to CMDBs 60 storing such information, and instead generate and/or view the corresponding instance configuration file 56 of the instance 42.

Figure 11:
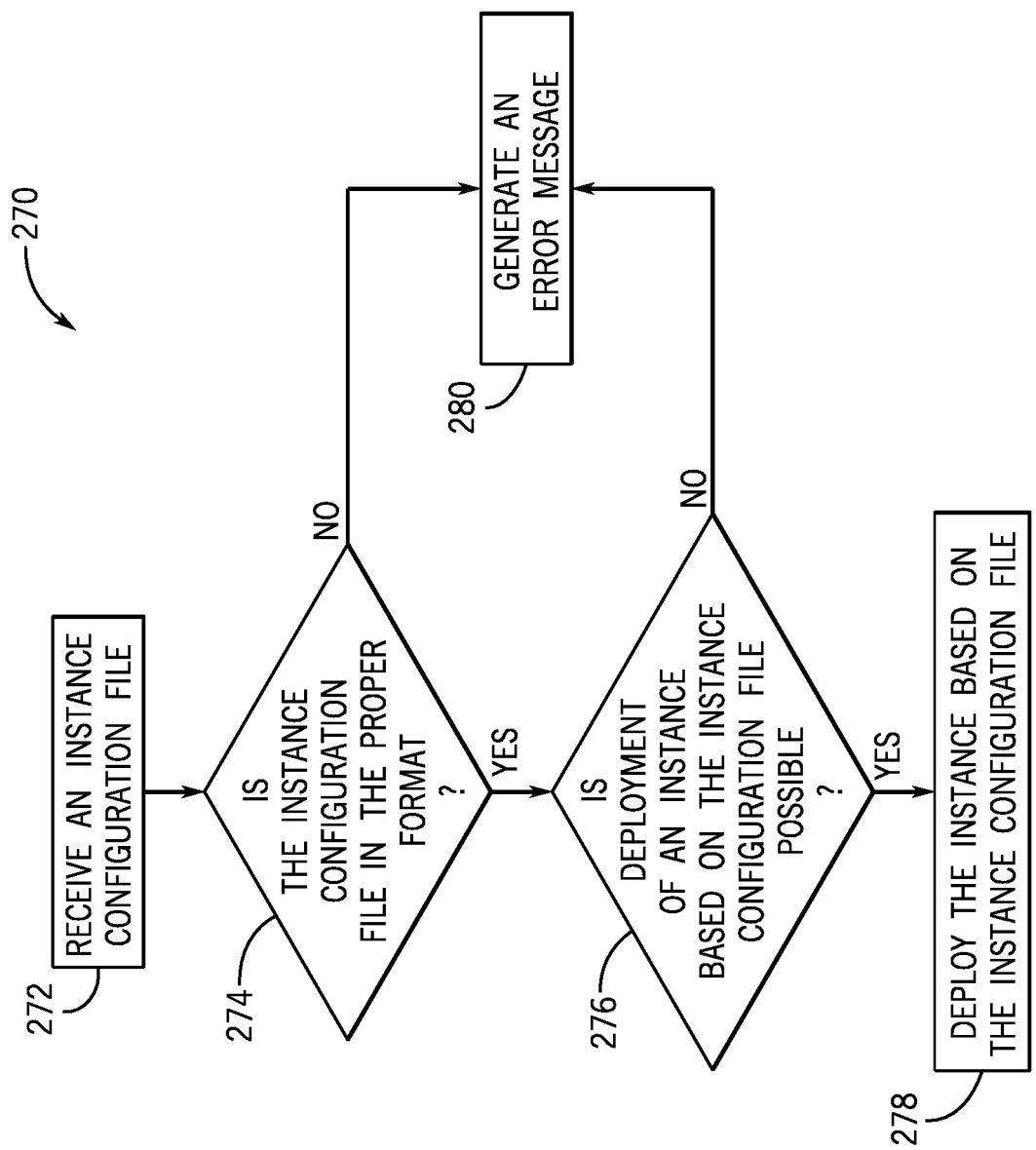
FIG. 11 is a flowchart of a process for provisioning or deploying an instance, according to embodiments of the present disclosure.

FIG. 11 is a flowchart of a process 270 for provisioning or deploying an instance 42, according to embodiments of the present disclosure. The process 270 may be implemented in the form of a software application that includes instructions executable by at least one suitable processor of the cloud computing system 10, such as the processor 82. In particular, the process 270 may be performed by the provisioning/deployment tool 152 as operated by the instance mapping engine 50. As such, at least some of the following steps may be described as being performed by the processor 82, as part of the instance mapping engine 50, controlling the provisioning/deployment tool 152. The illustrated process 270 is merely provided as an example, and in other embodiments, certain illustrated steps of the process 270 may be performed in other orders, skipped, or repeated, in accordance with the present disclosure.

As illustrated, in process block 272, the processor 82 receives an instance configuration file 56. In some embodiments, the processor 82 may receive the instance configuration file 56 from the instance configuration file storage 62 in response to receiving a request to provision or deploy an instance 42 (from a user via the physical infrastructure 132 or the automations 134).

In decision block 274, the processor 82 determines whether the instance configuration file 56 is in the proper format. For example, the processor 82 may parse the instance configuration file 56 and determine whether application servers 24, database servers 44, and/or properties of the application servers 24 and/or database servers 44 may be read from the instance configuration file 56. If so, the processor 82 may determine that the instance configuration file 56 is in the proper format. Otherwise, the processor 82 may determine that the instance configuration file 56 is not in the proper format.

If the processor 82 determines that the instance configuration file 56 is in the proper format, then the processor 82, in decision block 276, determines whether provision or deployment of the instance 42 based on the instance configuration file 56 is possible. For example, the processor 82 may parse the instance configuration file 56 and determine whether the application servers 24, database servers 44, and/or properties of the application servers 24 and/or database servers 44 may be provisioned and/or deployed. In particular, the processor 82 may determine whether provision or deployment of the instance 42 based on the instance configuration file 56 meets one or more threshold criteria. The one or more threshold criteria may include whether provision or deployment of the instance 42 based on the instance configuration file 56 does not exceed a threshold amount of computing resources, does not exceed a threshold amount of financial resources, and/or does not violate a policy (e.g., such as a policy provided in a policy file 200 shown in FIG. 9). As such, the application servers 24, database servers 44, and/or properties of the application servers 24 and/or database servers 44 may be not provisioned and/or deployed when there are insufficient computing resources, client budgets do not allow such provisioning or deployment, policies do not allow such provisioning or deployment, or the like.

If the processor 82 determines that provision or deployment of the instance 42 is possible (e.g., meets the one or more threshold criteria), then the processor 82, in process block 278, deploys the instance 42 based on the instance configuration file 56. If the processor 82 determines that provision or deployment of the instance 42 is not possible, or if the processor 82 determines that the instance configuration file 56 is in the proper format from decision block 274, then the processor 82, in process block 280, generates an error message (and does not provision or deploy the instance 42). The error message may be displayed, for example, on the instance dashboard 224 of the presentation system 222. In this manner, the process 270 may enable the processor 82 to provision or deploy an instance 42 based on an instance configuration file 56. As such, a service provider engineer may avoid having to manually configure settings or properties of an instance 42 to provision and/or deploy a desired instance 42. Instead, the service provider engineer may create or generate an instance configuration file 56 with the properties of the desired instance 42, and use the process 270 to quickly and conveniently provision and/or deploy the desired instance 42 based on the instance configuration file 56, greatly simplifying and expediting the process of provisioning or deploying an instance 42.

Figure 12:
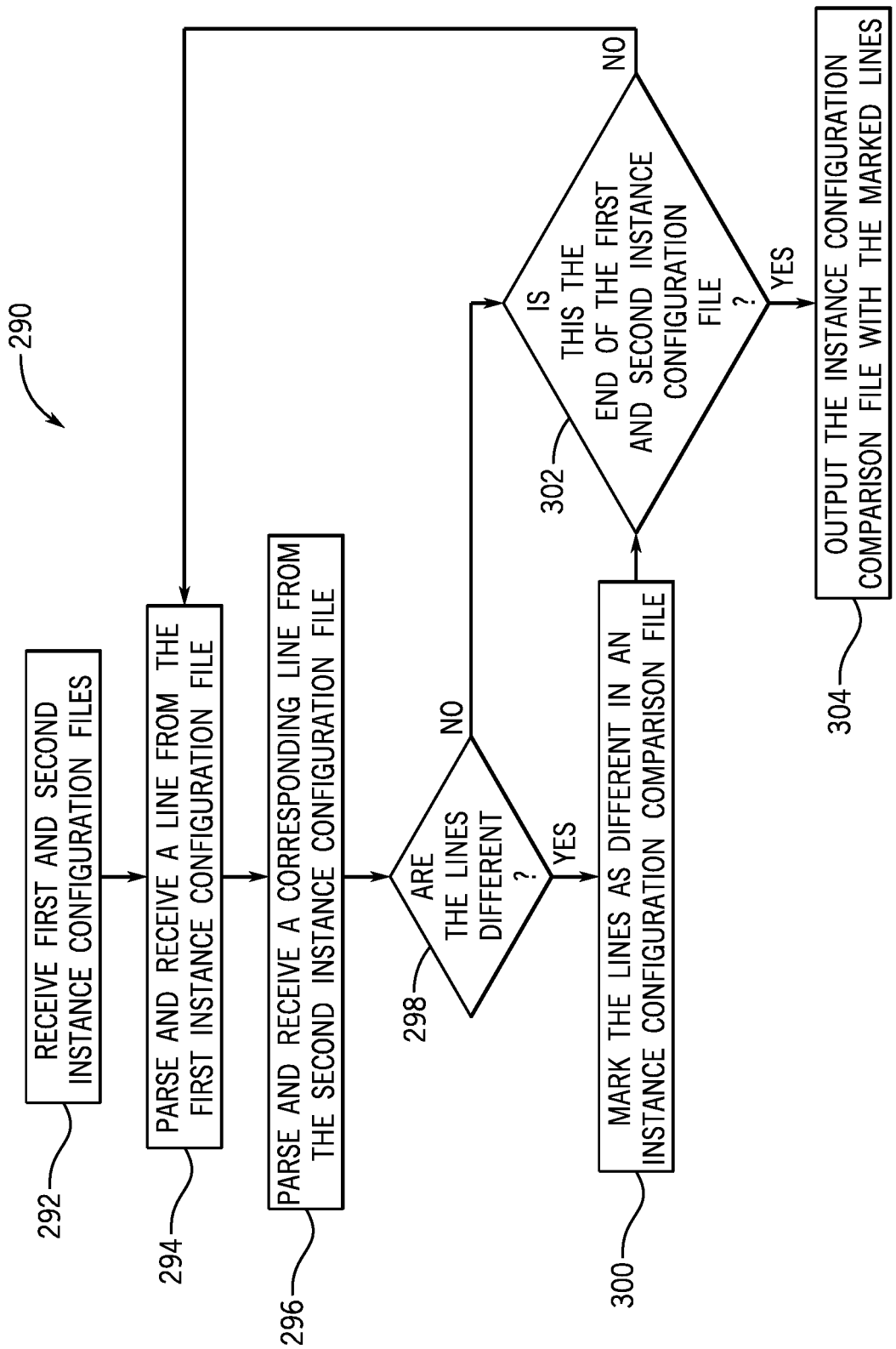
FIG. 12 is a flowchart of a process for determining differences between two instance configuration files, according to embodiments of the present disclosure.

FIG. 12 is a flowchart of a process 290 for determining differences between two instance configuration files 56, according to embodiments of the present disclosure. The process 290 may be implemented in the form of a software application that includes instructions executable by at least one suitable processor of the cloud computing system 10, such as the processor 82. In particular, the process 290 may be performed by the difference tool 154 as operated by the instance mapping engine 50. As such, at least some of the following steps may be described as being performed by the processor 82, as part of the instance mapping engine 50, controlling the difference tool 154. The illustrated process 290 is merely provided as an example, and in other embodiments, certain illustrated steps of the process 290 may be performed in other orders, skipped, or repeated, in accordance with the present disclosure.

As illustrated, in process block 292, the processor 82 receives two instance configuration files 56. In some embodiments, the processor 82 may receive the instance configuration files 56 from the instance configuration file storage 62 (from a user via the physical infrastructure 132 or the automations 134) along with a request to compare the two instance configuration files 56.

In process block 294, the processor 82 parses and receives a line from the first instance configuration file 56 of the two instance configuration files 56. Similarly, in process block 296, the processor 82 parses and receives a corresponding line from the second instance configuration file 56 of the two instance configuration files 56. In some embodiments, the corresponding line from the second instance configuration file 56 may have the same line number as the line from the first instance configuration file 56.

In decision block 300, the processor 82 determines whether the line from the first instance configuration file 56 and the corresponding line from the second instance configuration file 56 are different. For example, the processor 82 may determine that the lines are different if the lines do not have the same text.

If the processor 82 determines that the line from the first instance configuration file 56 and the corresponding line from the second instance configuration file 56 are different, then the processor 82, in process block 300, marks the lines as different in a instance configuration comparison file 170. For example, in the example instance configuration comparison file 170 of FIG. 8, the processor 82 marks the lines 29, 76, 84, and 94 as different by shading 176 the different lines.

Then, or if the processor 82 determines that the line from the first instance configuration file 56 and the corresponding line from the second instance configuration file 56 are not different from decision block 298, the processor 82, in decision block 302, determines whether the end of the two instance configuration files 56 have been reached. If the processor 82 determines that the end of the two instance configuration files 56 have not been reached, then the processor 82 receives the next lines of the two instance configuration files 56 in process blocks 294 and 296. If the processor 82 determines that the end of the two instance configuration files 56 have been reached, then the processor 82, in process block 304, outputs the instance configuration comparison file 170 with the marked different lines. In some embodiments, a user may view the instance configuration comparison file 170 in the difference visualizer 226 of the presentation system 222. In some cases, the processor 82 may save the instance configuration comparison file 170 in a memory or storage device, such as the memory 86. In this manner, the process 290 may enable the processor 82 to determine differences between two instance configuration files 56 and generate the instance configuration comparison file 170. The process 290 may be particularly useful when an instance 42 generates an error or is otherwise determined to be unhealthy. For example, a user may use the process 290 to compare a previous instance configuration file 56 corresponding to a previously healthy version of the instance 42 to a currently instance configuration file 56. The differences determined by the process 290 may be examined or analyzed to determine the source of the error.

Figure 13:
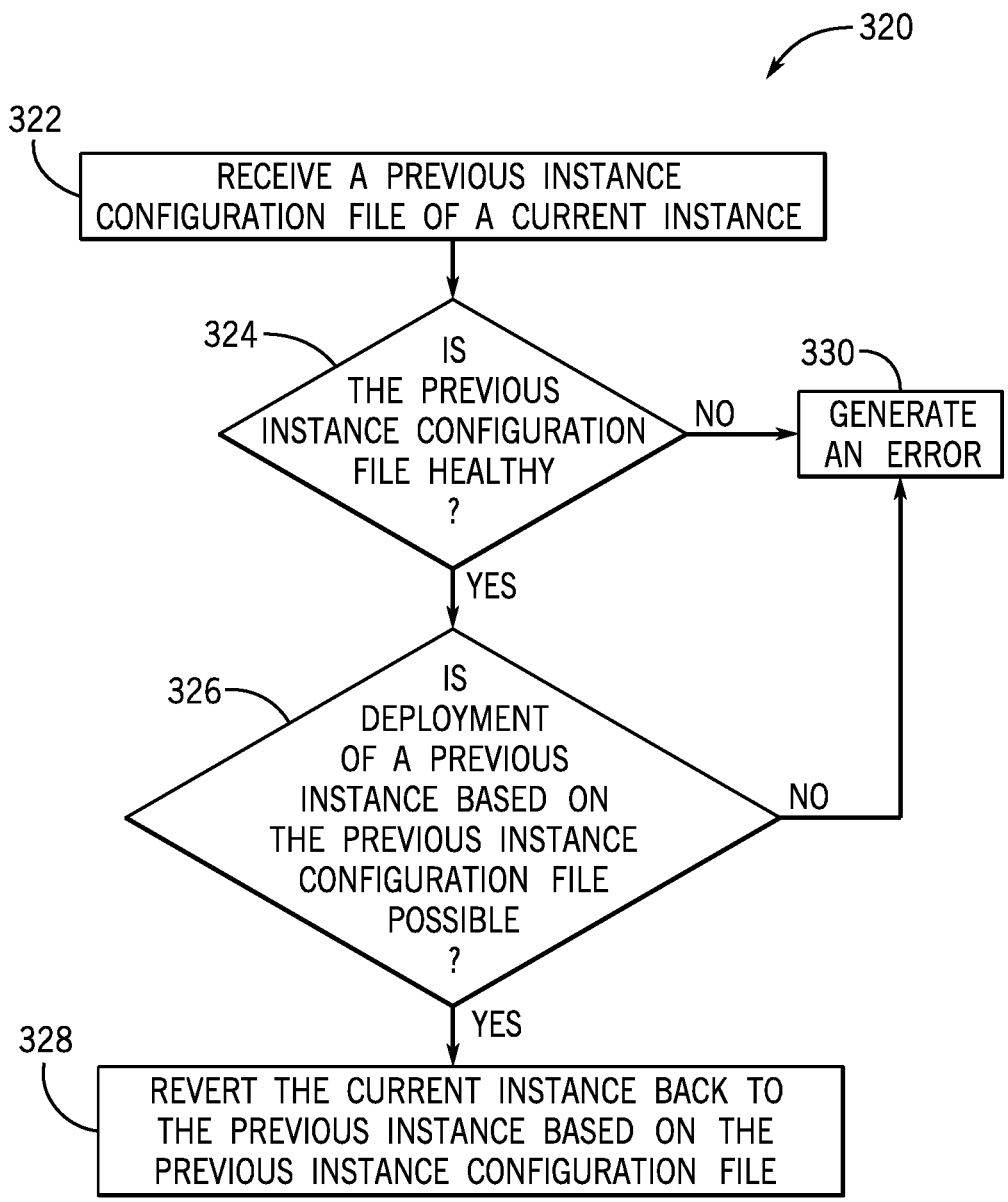
FIG. 13 is a flowchart of a process for reverting an instance back to a previous instance, according to embodiments of the present disclosure.

FIG. 13 is a flowchart of a process 320 for reverting an instance 42 back to a previous instance 42, according to embodiments of the present disclosure. The process 320 may be implemented in the form of a software application that includes instructions executable by at least one suitable processor of the cloud computing system 10, such as the processor 82. In particular, the process 320 may be performed by the health management tool 190 as operated by the instance mapping engine 50. As such, at least some of the following steps may be described as being performed by the processor 82, as part of the instance mapping engine 50, controlling the health management tool 190. The illustrated process 320 is merely provided as an example, and in other embodiments, certain illustrated steps of the process 320 may be performed in other orders, skipped, or repeated, in accordance with the present disclosure.

As illustrated, in process block 322, the processor 82 receives a previous instance configuration file 56 of a current instance 42. In particular, the current instance 42 may be currently running for a client, and the current instance 42 may once have been provided as a previous version of the current instance 42 (which may be referred to as a previous instance 42). The previous instance 42 may have been mapped to the previous instance configuration file 56 (e.g., by the instance mapper 102). The processor 82 may receive the previous instance configuration file 56 from the instance configuration file storage 62 in response to receiving a request to revert the instance 42 back to a previous instance 42 (from a user via the physical infrastructure 132 or the automations 134).

In decision block 324, the processor 82 determines whether the previous instance configuration file 56 is healthy. The processor 82 may determine an instance configuration file 56 as healthy based on any suitable metric. For example, the processor 82 may identify an instance configuration file 56 as healthy if the corresponding instance 42 did not generate any errors, or generates errors below a threshold number of errors. Similarly, an instance configuration file 56 may be unhealthy if the corresponding instance 42 generated errors, or generated errors above a threshold number of errors.

If the processor 82 determines that the previous instance configuration file 56 is healthy, then the processor 82, in decision block 326, determines whether provision or deployment of the previous instance 42 based on the previous instance configuration file 56 is possible. For example, the processor 82 may parse the previous instance configuration file 56 and determine whether the application servers 24, database servers 44, and/or properties of the application servers 24 and/or database servers 44 may be provisioned and/or deployed. In particular, the processor 82 may determine whether provision or deployment of the instance 42 based on the previous instance configuration file 56 meets one or more threshold criteria. The one or more threshold criteria may include whether provision or deployment of the instance 42 based on the previous instance configuration file 56 does not exceed a threshold amount of computing resources, does not exceed a threshold amount of financial resources, and/or does not violate a policy (e.g., such as a policy provided in a policy file 200 shown in FIG. 9). As such, the application servers 24, database servers 44, and/or properties of the application servers 24 and/or database servers 44 may be not provisioned and/or deployed when there are insufficient computing resources, client budgets do not allow such provisioning or deployment, policies do not allow such provisioning or deployment, or the like.

Figure 14:
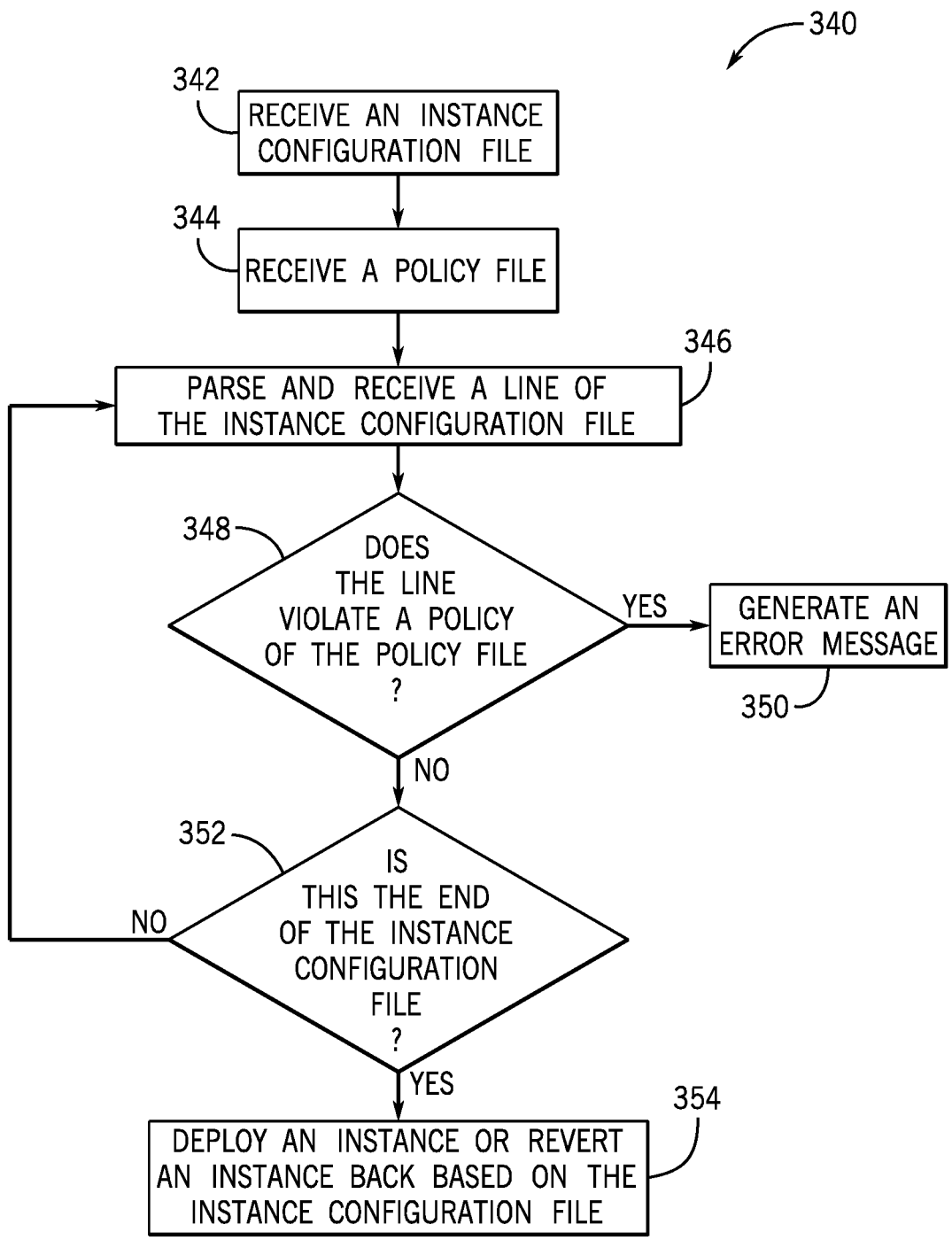
FIG. 14 is a flowchart of a process for enforcing a policy associated with an instance, according to embodiments of the present disclosure.

If the processor 82 determines that provision or deployment of the previous instance 42 is possible (e.g., meets the one or more threshold criteria), then the processor 82, in process block 328, reverts the current instance 42 back to the previous instance 42 based on the previous instance configuration file 56. For example, the processor 82 may follow the process 270 shown in FIG. 11 to revert or deploy the previous instance 42. If the processor 82 determines that provision or deployment of the previous instance 42 is not possible, or if the processor 82 determines that the previous instance configuration file 56 is not healthy from decision block 324, then the processor 82, in process block 330, generates an error message (and does not provision or deploy the previous instance 42). The error message may be displayed, for example, on the instance dashboard 224 of the presentation system 222. In this manner, the process 270 may enable the processor 82 to revert a current instance 42 back to a previous instance 42 based on a previous instance configuration file 56. As such, the process 270 may quickly and conveniently restore an instance 42 to a healthy state FIG. 14 is a flowchart of a process 340 for enforcing a policy associated with an instance 42, according to embodiments of the present disclosure. The process 340 may be implemented in the form of a software application that includes instructions executable by at least one suitable processor of the cloud computing system 10, such as the processor 82. In particular, the process 340 may be performed by the policy management tool 192 as operated by the instance mapping engine 50. As such, at least some of the following steps may be described as being performed by the processor 82, as part of the instance mapping engine 50, controlling the policy management tool 192. The illustrated process 340 is merely provided as an example, and in other embodiments, certain illustrated steps of the process 340 may be performed in other orders, skipped, or repeated, in accordance with the present disclosure.

As illustrated, in process block 342, the processor 82 receives an instance configuration file 56. The instance configuration file 56 may be for an instance 42 that has not yet been provisioned and/or deployed, but for which a user desires to provision and/or deploy. In some embodiments, the processor 82 may receive the instance configuration file 56 from the instance configuration file storage 62 in response to receiving a request to enforce a policy associated with an instance 42 (from a user via the physical infrastructure 132 or the automations 134).

In process block 344, the processor 82 receives a policy file 200, such as that shown in FIG. 9. The policy file 200 may restrict usage of certain resources used by an instance 42. In particular, certain lines of the policy file 200 may limit the amount of resources used by an instance 42 to a threshold amount. In some embodiments, a memory or storage device, such as the memory 86, may store the policy file 200, and the processor 82 may receive the policy file 200 from the memory 86 in response to receiving a request to enforce a policy associated with an instance 42 (from a user via the physical infrastructure 132 or the automations 134).

In process block 346, the processor 82 parses and receives a line from the instance configuration file 56. In decision block 348, the processor 82 determines whether the line violates a policy of the policy file 200. In some embodiments, the policy file 200 may have certain lines that include policies to be enforced on an instance 42. As such, the processor 82 may parse and receives lines of the policy file 200, and, for each line of the policy file 200 that the processor 82 determines is a policy, the processor 82 may compare with the line from the instance configuration file 56 to determine whether the line violates the policy. Using FIG. 9 as an example, the processor 82 may parse line 8 of the policy file 200 and determine that the line 8 includes a policy 202. Namely, the policy 202 defines a minimum number of nodes or application servers 24 of the instance 42 to be four. If the processor 82 parses and receives a line from the instance configuration file 56 setting the number of application servers 24 of the instance 42 to two, then the processor 82 may determine that the line of the instance configuration file 56 violates the policy 202 of the policy file 200.

If the processor 82 determines that the line violates a policy of the policy file 200, then the processor 82, in process block 350, generates an error message (and does not provision or deploy the instance 42 based on the instance configuration file 56). The error message may be displayed, for example, on the instance dashboard 224 of the presentation system 222. If the processor 82 determines that the line does not violate a policy of the policy file 200, then the processor 82, in process block 352, determines whether the end of the instance configuration file 56 has been reached (e.g., such that the entire instance configuration file 56 has been parsed). If not, the processor 82 proceeds to the next line of the instance configuration file 56 at process block 346. If so, in process block 354, the processor 82 deploys the instance 46 based on the instance configuration file 56 or reverts a current instance 46 back to the instance 46 based on the instance configuration file 56. In some embodiments, the processor 82 may first determine whether provision or deployment of the instance 42 is possible. For example, the processor 82 may parse the instance configuration file 56 and determine whether the application servers 24, database servers 44, and/or properties of the application servers 24 and/or database servers 44 may be provisioned and/or deployed. In particular, the processor 82 may determine whether provision or deployment of the instance 42 based on the instance configuration file 56 meets one or more threshold criteria. The one or more threshold criteria may include whether provision or deployment of the instance 42 based on the instance configuration file 56 does not exceed a threshold amount of computing resources, does not exceed a threshold amount of financial resources, and/or does not violate a policy (e.g., such as a policy provided in a policy file 200 shown in FIG. 9). As such, the application servers 24, database servers 44, and/or properties of the application servers 24 and/or database servers 44 may be not provisioned and/or deployed when there are insufficient computing resources, client budgets do not allow such provisioning or deployment, policies do not allow such provisioning or deployment, or the like. Additionally, the processor 82 may follow the process 270 shown in FIG. 11 to provision or deploy the instance 42. In this manner, the process 340 may enable the processor 82 to efficiently and effectively enforce a policy associated with an instance 42.

Figure 15:
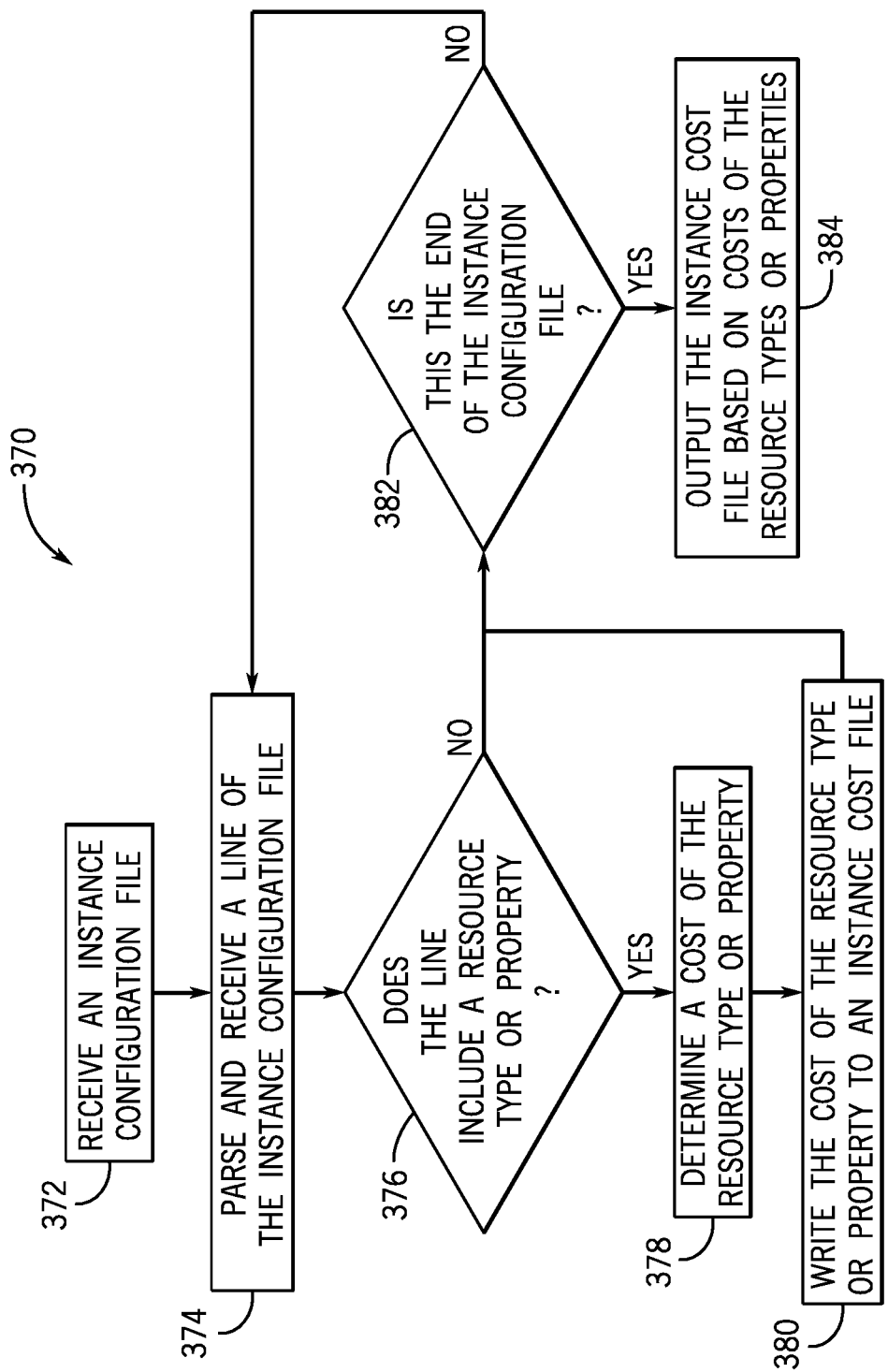
FIG. 15 is a flowchart of a process for determining financial costs associated with implementing an instance, according to embodiments of the present disclosure.

FIG. 15 is a flowchart of a process 370 for determining financial costs associated with implementing an instance 42, according to embodiments of the present disclosure. The process 370 may be implemented in the form of a software application that includes instructions executable by at least one suitable processor of the cloud computing system 10, such as the processor 82. In particular, the process 370 may be performed by the resource utilization tool 220 as operated by the instance mapping engine 50. As such, at least some of the following steps may be described as being performed by the processor 82, as part of the instance mapping engine 50, controlling the resource utilization tool 220. The illustrated process 370 is merely provided as an example, and in other embodiments, certain illustrated steps of the process 370 may be performed in other orders, skipped, or repeated, in accordance with the present disclosure.

As illustrated, in process block 372, the processor 82 receives an instance configuration file 56. In cases where the user desires to determine a cost of a prospective instance 42 (e.g., prior to provisioning or deploying the instance 42), the instance configuration file 56 may be for an instance 42 that has not yet been provisioned and/or deployed. In some embodiments, the processor 82 may receive the instance configuration file 56 from the instance configuration file storage 62 in response to receiving a request to determine financial costs associated with implementing the instance 42 (from a user via the physical infrastructure 132 or the automations 134).

In process block 374, the processor 82 parses and receives a line from the instance configuration file 56. In decision block 376, the processor 82 determines whether the line includes a resource type or property. A line from the instance configuration file 56 may include fields that each correspond to resource types (e.g., application servers 24 or database servers 44) of the instance 42 or properties of the application servers 24 or database servers 44 of the instance 42. For instance, line 8 of FIG. 4 illustrates a resource type ("node" or application server 24) and line 10 of FIG. 4 illustrates a property of the application server 24 (operational status is "1" or operational).

If the processor 82 determines that the line includes a resource type or property, then the processor 82, in process block 378, determines a cost of the resource type or property. In some embodiments, the resource utilization tool 220 may query a database (e.g., stored in a memory or storage device, such as the memory device 86) that returns a cost for an application server 24, a database server 44, or a property of the application server 24 or database server 44.

In process block 380, the processor 82 then writes the cost of the resource type or property to an instance cost file. The instance cost file may include an itemized bill with the costs for each application server 24, database server 44, and/or property, a total bill for all costs summed together, or both.

In decision block 382, the processor 82 determines whether the end of the instance configuration file 56 has been reached (e.g., such that the entire instance configuration file 56 has been parsed). If not, or if the processor 82 determines that the line of the instance configuration file 56 does not include a resource type or property from decision block 376, the processor 82 proceeds to the next line of the instance configuration file 56 at process block 374. If so, in process block 384, the processor 82 outputs the instance cost file based on the costs of the resource types and/or properties. In some embodiments, a user may view the instance cost file in the instance dashboard 224 of the presentation system 222. In some cases, the processor 82 may save the instance cost file in a memory or storage device, such as the memory 86. As such, the process 370 may enable the processor 82 to determine financial costs associated with implementing an instance 42 defined by an instance configuration file 56. In this manner, clients may design and price difference instance configurations without having to execute the configurations.

Thus, the presently disclosed systems and methods collect information associated with network environment and service provider cloud infrastructure client instances (also referred to herein as client instances or instances) 42, and use the information associated with the instances 42. In particular, information related to the database servers 44 and/or applications servers 24 providing the instance 42 may be retrieved from configuration management databases (CMDBs) 60 that store information relating to instances 42, and written and saved in a configuration or instance configuration file 56. Thus, the instance configuration file 56 provides a single, centralized source of information related to an instance 42. As such, a user (e.g., a client or service provider engineer) desiring to retrieve or view information relating to an instance 42 may avoid the tedious process of submitting multiple search queries to CMDBs 60 storing such information, and instead generate and/or view the corresponding instance configuration file 56 of the instance 42.

Moreover, instances 42 may be deployed or provisioned by reading an instance configuration file 56 and setting properties of the instance 42 using the parameters saved in the instance configuration file 56. Two instance configuration files 56 may be compared to determine differences between the two files. For example, if an instance 42 generates an error or is otherwise faulty or unhealthy, a previous instance configuration file 56 corresponding to a previously healthy version of the instance 42 may be compared to the current instance configuration file 42, and the differences determined. The differences may be examined or analyzed to determine the source of the error. Additionally, the instance 42 may be reverted back to the previously healthy version of the instance 42 using the previous instance configuration file 56.

The disclosed systems and methods also include enforcing policies related to instances 42. For example, policies may restrict usage of certain resources used by an instance 42. If there is an attempt to provision or deploy an instance 42 using an instance configuration file 56 that violates a policy (e.g., exceeds a limited use of a resource), then the attempt may be blocked or prevented from executing. The disclosed systems and methods may also include determining financial costs associated with implementing an instance 42 defined by an instance configuration file 56. In this manner, clients may design and price difference instance configurations without having to execute the configurations.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud computing system comprising:
   one or more data centers;
   a client instance hosted by the one or more data centers, wherein the client instance utilizes one or more application servers, one or more database servers, or both, and is accessible by one or more remote client networks; and
   an instance mapping engine configured to:
      receive a mapping rules file, wherein the mapping rules file comprises one or more fields associated with the one or more application servers, the one or more database servers, or both;
      parse the mapping rules file;
      receive one or more fields associated with the one or more application servers, the one or more database servers, or properties of the one or more application servers or the one or more database servers based on parsing the mapping rules file;
      request the one or more field values of the fields associated with the one or more application servers, the one or more database servers, or the properties of the one or more application servers or the one or more database servers, from one or more configuration management databases; and
      generate an instance configuration file based on the one or more fields of the mapping rules file configured to list the one or more application servers, the one or more database servers, or both, and one or more properties of the one or more application servers, the one or more database servers, or both.

2. The cloud computing system of claim 1, comprising the one or more configuration management databases configured to store information associated with the one or more application servers, the one or more database servers, or both.

3. The cloud computing system of claim 2, wherein the instance mapping engine is configured to receive the information associated with the one or more application servers, the one or more database servers, or both, from the one or more configuration management databases.

4. The cloud computing system of claim 1, wherein the instance mapping engine is configured to write the one or more field values to the instance configuration file.

5. The cloud computing system of claim 1, comprising an instance dashboard configured to enable viewing the instance configuration file.

6. The cloud computing system of claim 5, wherein the instance mapping engine is configured to output the instance configuration file to the instance dashboard.

7. The cloud computing system of claim 1, wherein the properties of the client instance comprise names, identifiers, uses, statuses, addresses, host names, host identifiers, capacities, sizes, or any combination thereof, of the one or more application servers, the one or more database servers, or both.

8. The cloud computing system of claim 1, wherein generating the instance configuration file occurs in response to determining that the entire mapping rules file has been parsed.

9. A cloud computing system, comprising:
   an instance mapping engine, implemented via one or more processors, communicatively coupled to one or more databases configured to store resource types or properties of a client instance of the cloud computing system, wherein the instance mapping engine is configured to:
      receive a mapping rules file comprising one or more fields associated with the resource types or the properties of the client instance;
      parse the mapping rules file;
      receive a line of the mapping rules file;
      request the resource types or the properties from the one or more databases in response to determining that the line of the mapping rules file comprises the resource types or the properties; and
      generate an instance configuration file based on the resource types or the properties.

10. The instance mapping engine of claim 9, wherein the resource types of the client instance comprise one or more application servers, one or more database servers, or both.

11. The instance mapping engine of claim 10, wherein the one or more application servers, the one or more database servers, or both, are configured to provide the client instance.

12. The instance mapping engine of claim 9, wherein the properties of the client instance comprise names, identifiers, uses, statuses, addresses, host names, host identifiers, capacities, sizes, or any combination thereof, of one or more application servers, one or more database servers, or both.

13. The instance mapping engine of claim 9, wherein the instance mapping engine is configured to receive information associated with one or more application servers, one or more database servers, or both, from one or more configuration management databases that are configured to store information associated with the one or more application servers, the one or more database servers, or both.

14. A method for mapping a client instance of a cloud computing system comprising:
- receiving a mapping rules file comprising one or more fields associated with resource types or properties of the client instance;
- parsing the mapping rules file;
- receiving a line of the mapping rules file;
- determining that the line comprises the resource types or the properties of the client instance;
- requesting the resource types or the properties from one or more databases configured to store the resource types or the properties of the client instance;
- generating an instance configuration file based on the resource types or the properties; and
- writing the resource types or the properties to the instance configuration file in response to determining that the line comprises the resource types or the properties.

15. The method of claim 14, wherein generating the instance configuration file occurs in response to determining that the entire mapping rules file has been parsed.

16. The method of claim 14, comprising outputting the instance configuration file to an instance dashboard of the cloud computing system for viewing.

17. The method of claim 14, wherein the resource types of the client instance comprise one or more application servers, one or more database servers, or both.

18. The method of claim 14, wherein the properties of the client instance comprise names, identifiers, uses, statuses, addresses, host names, host identifiers, capacities, sizes, or any combination thereof, of one or more application servers, one or more database servers, or both.

19. The method of claim 14, comprising providing the client instance via one or more application servers, one or more database servers, or both.

20. The method of claim 19, wherein writing the resource types or the properties to the instance configuration file comprises storing the instance configuration file to one or more configuration management databases configured to store information associated with the one or more application servers, the one or more database servers, or both.

* * * * *